Nov. 27, 1956 G. D. BRUCE ET AL 2,772,370

BINARY TRIGGER AND COUNTER CIRCUITS EMPLOYING MAGNETIC MEMORY DEVICES

Filed Dec. 31, 1953 3 Sheets-Sheet 1

INVENTORS
GEORGE D. BRUCE
JOSEPH C. LOGUE
BY P. E. Henninger
ATTORNEY

INVENTORS
GEORGE D. BRUCE
JOSEPH C. LOGUE
BY P. E. Henninger
ATTORNEY

Nov. 27, 1956 G. D. BRUCE ET AL 2,772,370

BINARY TRIGGER AND COUNTER CIRCUITS EMPLOYING MAGNETIC MEMORY DEVICES

Filed Dec. 31, 1953 3 Sheets-Sheet 3

INVENTORS
GEORGE D. BRUCE
JOSEPH C. LOGUE
BY P. E. Henninger
ATTORNEY

United States Patent Office 2,772,370

Patented Nov. 27, 1956

2,772,370

BINARY TRIGGER AND COUNTER CIRCUITS EMPLOYING MAGNETIC MEMORY DEVICES

George D. Bruce, Wappinger Falls, and Joseph C. Logue, Kingston, N. Y., assignors to International Business Machines Corporation, New York, N. Y., a corporation of New York Application December 31, 1953, Serial No. 401,674

16 Claims. (Cl. 307—88)

This invention relates to binary trigger circuits employing magnetic memory devices and counter circuits utilizing such binary trigger circuits.

A binary trigger circuit may be defined as a circuit which responds to two successive input pulses of the same polarity to produce a single output pulse. Each output pulse may therefore be said to count a pair of input pulses.

A counter circuit may be defined as one which produces an output pulse corresponding to a given number of input pulses. By definition, therefore, a binary trigger circuit is a sort of counter circuit. Binary trigger circuits may be cascaded so that each stage in the cascade counts the output pulses from the preceding stage. If each stage is binary, then each succeeding stage provides a binary count of a higher order than the preceding stage. For example, the first stage counts by two's, the second by four's the third by eight's, and so on. A decimal counter circuit is one which produces an output pulse at the end of each series of ten successive input pulses.

It has been proposed to provide a decimal counter circuit comprising a number of binary stages coupled together. Such a decimal counter is disclosed, for example, in the United States patent to Phelps, No. 2,584,811.

Transistors have recently become popular as electrical translating devices, especially in connection with high speed electrical computers, where their low power and low voltage requirements provide a tremendous advantage in installations which may employ thousands of such translating devices. Such computers may employ many binary circuits and counters of the type described.

Binary trigger circuits have been proposed using transistors. Such circuits have been of the regenerative type, using a feedback from the output to the input, and have two stable output states, separated substantially as to current and potential values, being triggered back and forth between their two output states in response to input signals. In such a circuit, the transistor is typically continuously conductive, either at a high or low current. When shifting from a high current state to a low current state, such trigger circuits may be subject to difficulties due to "hole storage" in the transistor, for example, an increased "fall time" or delay in reaching the low current state. This continuous current may be considered as forming a memory of the last received signal and represents a substantial energy requirement which might be avoided by using pulse type signals and outputs and a memory device not requiring power.

Where it is desired to couple transistor binary trigger circuits in multiple stage arrangements, a further difficulty is presented in that transistors commonly have emitter input impedances much lower than their collector output impedances, so that special provisions are required for impedance matching between stages. Among the memory devices in current use, e. g., in the high speed computers previously mentioned, are magnetic memory devices which operate by magnetizing a core to the point of saturation in one direction. The state of polarization of the core is then utilized later to read the signal which was stored in the memory device by the polarizing action. The stored information is retained indefintely, until the state of magnetization of the core is changed by positively reversing it. Such magnetic memory devices have been constructed having low power and voltage requirements of the same order as the corresponding requirements of transistors.

An object of the present invention is to provide a binary trigger circuit employing a magnetic memory device to retain the impression of the last received signal.

Another object of the invention is to provide a multiple stage counter circuit including in each stage a magnetic memory device for retaining the impression of previously received signals.

A further object of the present invention is to provide circuits of the type described employing transistors.

Another object is to provide a binary trigger circuit employing transistors, and producing a pulse type output signal, rather than a steady output signal.

Another object is to provide a binary trigger circuit employing transistors and having improved impedance matching characteristics.

The foregoing and other objects are attained in the circuits described herein by providing a binary trigger stage including a saturable magnetic core having two driving windings and two feedback windings. Two amplifiers are provided for each stage, each amplifier having one driving winding connected in its output circuit and one feedback winding connected in its input circuit. Each amplifier, in the modifications shown and described, includes a transistor. Both amplifiers receive pulse signals from a common input. The pulse output signals are derived from a special output winding on the saturable core. The design of this winding may be varied as required for impedance matching purposes.

In the multiple stage counter circuit described herein, four binary trigger stages are connected in cascade. The first three stages are binary stages so that the third stage counts eight input pulses. The fourth stage is connected to count two additional input pulses after the eighth so that the output of the fourth stage provides a count of ten input pulses.

Other objects and advantages of our invention will become apparent from a consideration of the following specification and claims, taken together with the accompanying drawings.

FIGURE 1

Figure 1:
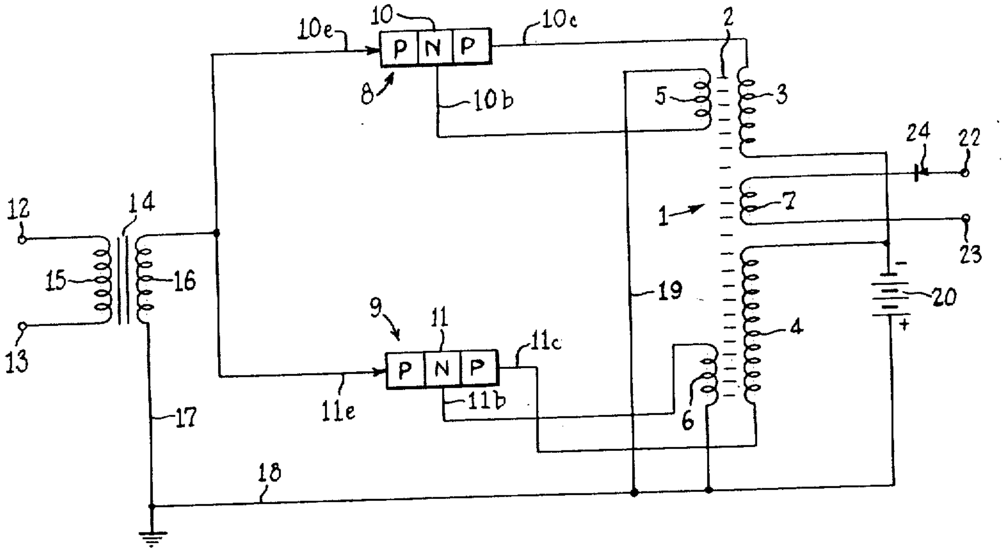
Figure 1 is a wiring diagram of a binary trigger circuit embodying the invention.

There is shown in Figure 1 a binary trigger circuit including a magnetic memory device generally indicated at 1 and having a saturable magnetic core 2, driving windings 3 and 4, feedback windings 5 and 6, and an output winding 7. The saturable core 2 is illustrated only diagrammatically in Fig. 1. It will be understood that a closed ring core is preferred, in accordance with the usual practice in such devices.

Two amplifiers 8 and 9 are connected to the magnetic memory device 1. The amplifier 8 includes a transistor 10 of the PNP junction type, having an emitter electrode **10*e*, a collector electrode 10*c* and a base electrode 10*b*. Amplifier 9 similarly includes a PNP junction transistor 11 having an emitter electrode 11*e*, a collector electrode 11*c*, and a base electrode 11*b***.

The input circuits of both amplifiers 8 and 9 receive signals from a pair of input terminals 12 and 13 through an input transformer 14 having a primary winding 15 and a secondary winding 16.

The input circuit of amplifier 8 may be traced from emitter electrode **10*e* through secondary winding 16, wires 17, 18 and 19, and feedback winding 5 to base electrode 10*b*. The input circuit for amplifier 9 may similarly be traced from emitter electrode 11*e* through secondary winding 16, wires 17 and 18, and feedback winding 6 to base electrode 11*b***.

The output circuit of amplifier 8 may be traced from collector electrode **10*c* through driving winding 3, battery 20, wires 18 and 19, and feedback winding 5 to base electrode 10*b*. The output circuit of amplifier 9 may similarly be traced from collector electrode 11*c* through driving winding 4, battery 20, wire 18 and feedback winding 6 to base 11*b***.

Output winding 7 is connected to output terminals 22 and 23 through an asymmetric impedance device 24.

OPERATION OF FIGURE 1

It should be observed that the driving windings 3 and 4 are connected so that currents of the same polarity flowing through them tend to magnetize the core 2 in opposite senses. Furthermore, the feedback windings 5 and 6 are connected so that the potentials induced in them by a change in current in their respectively associated driving windings 3 and 4, act on the input circuits of the respective transistors 10 and 11 in a sense to increase the emitter currents thereof, and thereby act cumulatively to increase the collector current flow in the winding 3 or 4, as the case may be. In other words, the windings 5 and 6 provide positive feedbacks from windings 2 and 3, respectively, to the amplifiers 8 and 9 respectively.

Considering the operation of the amplifier 8 alone (i. e., assuming amplifier 9 and its windings to be absent), then beginning with the core 2 demagnetized, a signal impressed on the amplifier input circuit will produce a current flowing continuously in the winding 3 and continuously increasing until a point is reached at which the core 2 is saturated. At that point, the coupling between the driving winding 3 and the feedback winding 5 is greatly reduced, and the amplifier is substantially cut off.

Both amplifiers are normally connected to their respective windings on the magnetic memory device, both are normally cut off and the core 2 is normally magnetically saturated in one direction or the other. When an input signal is received at terminals 12 and 13, both amplifiers 8 and 9 respond by sending currents through the driving windings 3 and 4. Since the core 2 is already saturated in one direction, the current through one of the driving windings is substantially ineffective to change the magnetic condition of the core, and consequently the amplifier associated with that driving winding receives no feedback impulse and is cut off. On the other hand, the current flowing in the other driving winding is effective to decrease the magnetization of the core. This change in the magnetization of the core produces a potential in the associated feedback winding in the proper direction to amplify the current in the driving winding. This cumulative process continues until the polarity of the core 2 is reversed and the core is saturated in the opposite direction. The driving amplifier is then cut off.

When the next impulse is received at the input terminals 12 and 13, there will again be only one of the two driving windings which is effective. However, it will be the driving winding which was not effective during the preceding impulse. Consequently, there will appear in the output winding 7 an output potential pulse for each input potential pulse at the input terminals 12 and 13, but the output potentials in the winding 7 will be alternately of opposite polarities. By connecting the asymmetric impedance unit 24 in series with the winding 7, the output signals of one polarity are suppressed so that only alternate output signals appear at the terminals 22 and 23. Consequently, the output signals provide a binary count of the input signals received at input terminals 12 and 13.

It should be noted that the output signals are pulses of limited duration, and that after each output signal, the amplifiers are both restored to their cut off condition.

The design of winding 7 may be varied as required for impedance matching purposes.

FIGURE 2

This figure illustrates a modified form of binary trigger circuit, in which the input circuits are connected in a somewhat different manner than in the circuit of Fig. 1. Specifically, the amplifiers are provided with base inputs rather than emitter inputs. The circuit and its operation are otherwise substantially the same as in Fig. 1.

Figure 2:
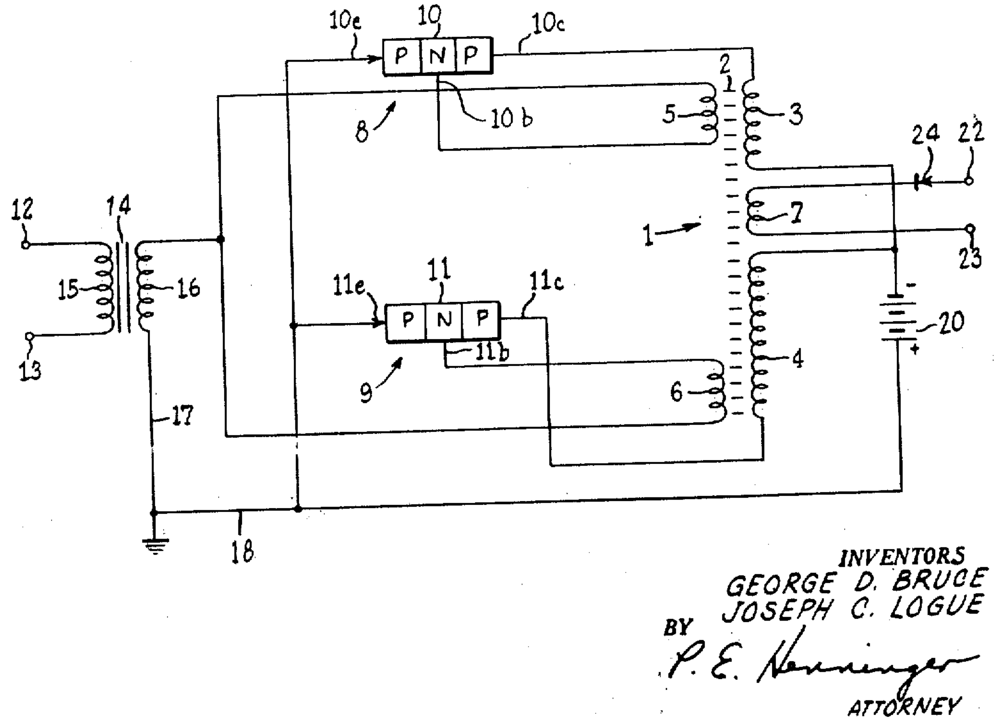
Figure 2 is a wiring diagram of a modified form of binary trigger circuit embodying the invention.

In view of the close relationship between the circuits of Figs. 1 and 2, each circuit element in Fig. 2 has been given the same reference numeral as its counterpart in Fig. 1 and the circuit of Fig. 2 will not be further described.

FIGURE 3

This figure illustrates a modified form of trigger circuit employing the principles of the invention. In this circuit there is illustrated a magnetic memory device 26, including a saturable ring core 27 on which are provided two driving windings 28 and 29, two feedback windings 30 and 31, and an output winding 32.

Two amplifiers 33 and 34 are provided. The amplifier 33 includes a point contact transistor having a body 35 of n-type semi-conductive material, an emitter electrode **35*e*, a collector electrode 35*c* and a base electrode 35*b*. Similarly, the amplifier 34 includes a transistor having a body 36 of n-type semi-conductive material, an emitter electrode 36*e*, a collector electrode 36*c* and a base electrode 36*b***.

The input circuit of amplifier 33 may be traced from emitter **35*e* through a resistor 37, a battery 38, battery 39, secondary winding 40 of an input transformer 41, wire 42 and feedback winding 30 to base electrode 35*b*. An asymmetric impedance unit 43 is connected between emitter electrode 35*e*** and ground.

The input circuit for amplifier 34 may be traced from emitter electrode **36*e* through wire 44, resistor 37, batteries 38 and 39, secondary winding 40, wire 45 and feedback winding 31 to base electrode 36*b***.

The input transformer 41 is provided with a primary winding 46 connected to input terminals 47 and 38.

The output circuit of amplifier 33 may be traced from collector electrode **35*c* through driving winding 28, battery 49, battery 39, secondary winding 40, wire 42, and feedback winding 30 to base electrode 35*b*. The output circuit of amplifier 34 may similarly be traced from collector 36*c* through driving winding 29, battery 49, battery 39, secondary winding 40, wire 45, and feedback winding 31 to base electrode 36*b***.

Output winding 32 is connected to output terminals 50 and 51.

OPERATION OF FIGURE 3

Figure 3:
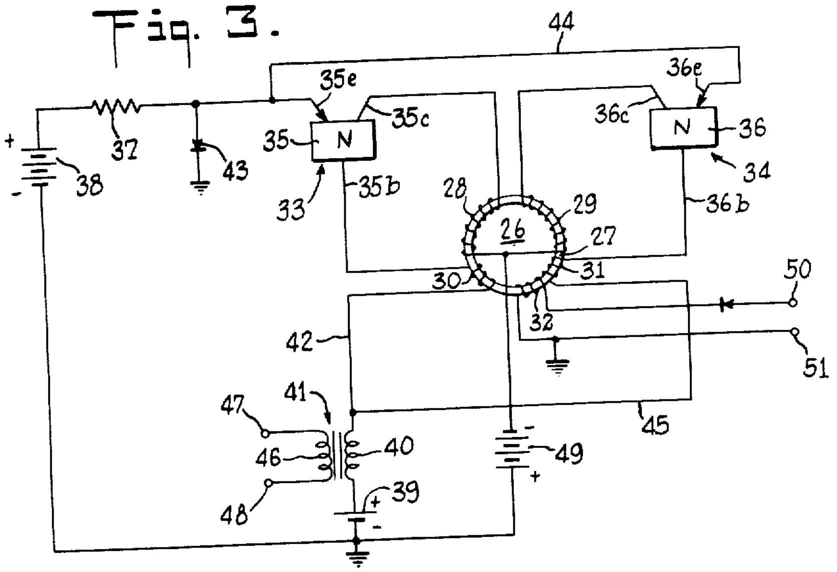
Figure 3 is a wiring diagram of still another modified form of binary trigger circuit embodying the invention.

The circuit of Fig. 3 and its operation are generally analogous to those in Figs. 1 and 2, except for the novel biasing arrangement for the two input circuits, including battery 38, resistor 37 and asymmetric impedance unit 43. These three circuit elements form a closed loop whose function is to supply, to the two emitters **35*e* and 36*e*, a constant amount of current which is sufficient to maintain only one of the two amplifiers 33 and 34 in its On condition. This input current supply arrangement cooperates with the blocking action due to the polarity of magnetization of the core 27** to prevent more than one of the two amplifiers from being On at any given time.

Considering the operation of this input circuit arrangement in detail, when an input signal is applied to transformer 41 having a polarity such that the upper terminal of secondary winding 40 as it appears in the drawing, becomes negative with respect to the lower terminal, and having a magnitude sufficient to overcome the bias of battery 39, that input signal tends to bias both emitters **35*e* and 36*e* positively with respect to their respective bases 35*b* and 36*b*, and thereby to cause a flow of current to the two emitters. As far as their emitter potentials are concerned, either transistor may then turn on. However, the common current source (battery 38 and resistor 37) will supply current only to the emitter whose potential is lowest. Due to the condition of saturation of core 27, only one of the two transistors can supply current to the core in such a direction as to cause a large change in flux and only that transistor will receive a feedback potential of the proper polarity to lower the potential of its base. The lowered base potential of that one transistor will cause substantially all the current from battery 38** to flow through its emitter. Hence the other transistor will be cut off. Once the action is initiated, that one transistor will, by virtue of the induced feedback voltage due to the changing flux, continue to conduct substantial current until it drives the core to its opposite saturated state. Then the feedback will cease and both transistors will be off until the next input signal.

The following table shows, by way of example, a particular set of values for the potentials of the various batteries and for the impedance of the various resistors, in a circuit which has been operated successfully. It will be understood that these values are set forth by way of example only and that the invention is not limited to these values or any of them. No value is given for the asymmetric impedance element 43, which may be considered to have substantially zero impedance in its forward direction and substantially infinite impedance in its reverse direction.

*Table I*

| | | |
|---|---|---|
| Windings **28** and **29** | turns | 150 |
| Windings **30**, **31** and **32** | do | 20 |
| Resistor **37** | ohms | 3000 |
| Battery **38** | volts | 15 |
| Battery **39** | do | 1½ |
| Battery **49** | do | 15 |

FIGURE 4

This figure illustrates a decimal counter circuit including four stages, each of which is generally equivalent to the binary trigger circuit illustrated in Figure 3. The four stages are respectively indicated by the reference numerals 52, 53, 54 and 55. For the most part, the individual circuit elements in each of the four stages correspond exactly to their counter parts in Figure 3. Consequently, those elements have been given the same reference numerals and will not be further described.

The output winding 32 of the stage 52 serves as an input winding for stage 53. Similarly, the output winding for stage 53 serves as an input winding for stage 54. The two amplifiers 33 and 34 in the final stage 55 are provided with separate input circuits, instead of being connected to a common input circuit, as in the other stages. Amplifier 34 has its input circuit connected to the output winding 32 of stage 54, and the input circuit of amplifier 33 is connected to a second output winding 56 in stage 52. The final stage 55 is provided with two output windings, the normal output winding 32 which is connected to output terminals 57 and 58 through an asymmetric impedance element 59, and a second output winding 60 which is connected through a wire 61 and an asymmetric impedance element 62 to the input circuit of the second stage 53.

OPERATION OF FIGURE 4

Conssider that a series of the input pulses are received at the input transformer 41 of stage 52. At the beginning of the series of pulses, the core 27 of stage 55 is magnetized in a direction such that the input pulses from winding 56 of stage 52 are ineffective to make the amplifier 33 of stage 55 conductive. The input pulses to amplifier 33 cannot then be effective until an input pulse is first received by the amplifier 34. The first eight of the input pulses are counted by the stages 52, 53 and 54, and when the count of eight is complete, the stage 54 produces an output pulse of a polarity which is proper to make the amplifier 34 of stage 55 conductive. This produces potentials in output windings 32 and 60 of stage 55, but their polarity is such that they are blocked by the asymmetric units 59 and 62. Thereafter, on the tenth pulse, the amplifier 33 of stage 55 receives a signal pulse from winding 56 of stage 52. The amplifier 33 is then effective to produce output pulses in the windings 32 and 60 of stage 55, of the proper polarity to pass through the asymmetric units 59 and 62.

The output pulse applied through winding 60 and wire 61 is effective in the input of stage 53 to block the output pulse from stage 52 which corresponds to the tenth in the series of input pulses. The output signal produced at winding 32 in stage 55 is transmitted to the output terminals 57 and 58, where it represents a decimal count of the input signals.

Figure 4:
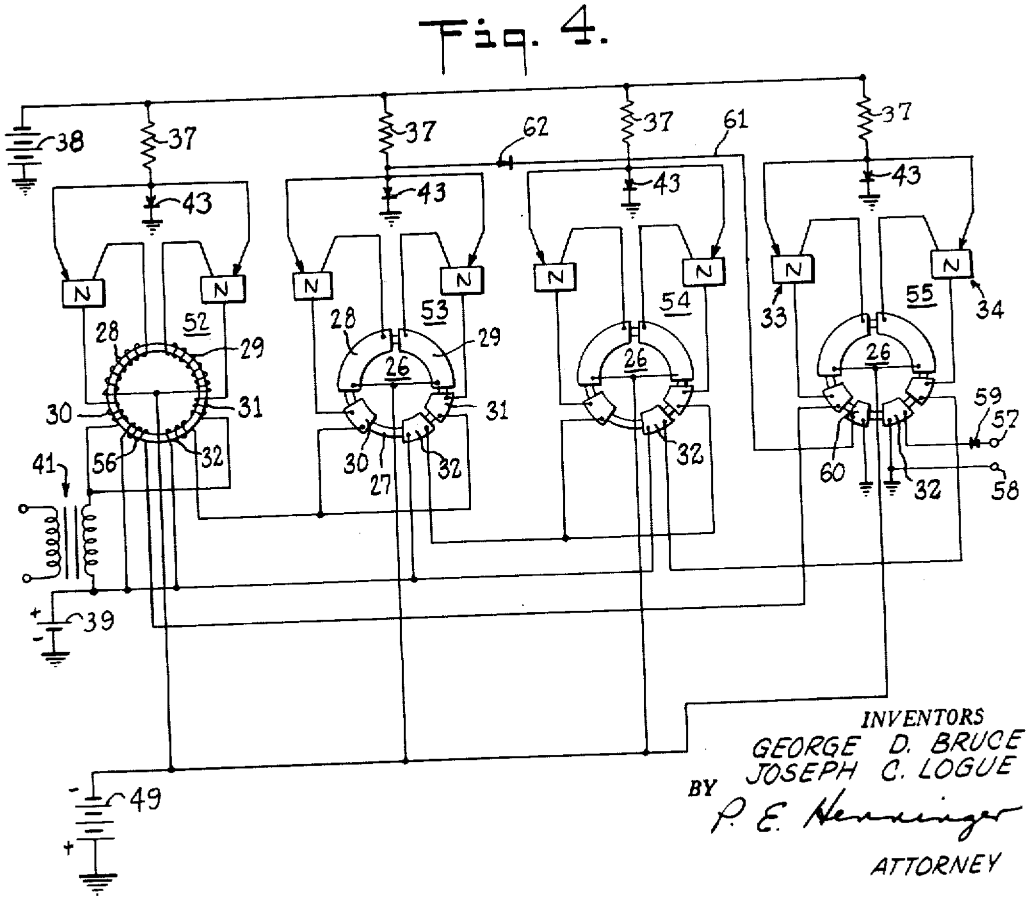
Figure 4 is a wiring diagram of a decimal counter circuit embodying the invention.
Figure 5:
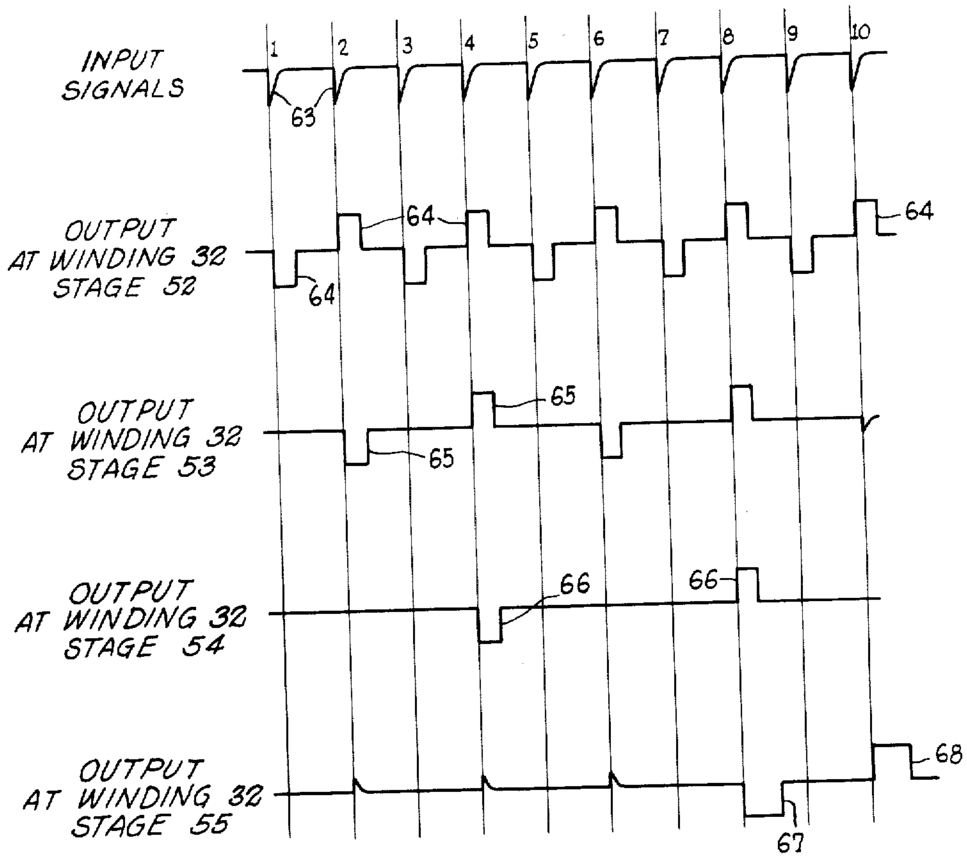
Figure 5 illustrates graphically the input signals and the signals at the outputs of the several stages in the circuit of Fig. 4.

Reviewing the operation of the circuit of Figure 4 in more detail, Figure 5 illustrates graphically a series of ten input pulses 63, which are applied through transformer 41 to the input stage 52. As described above, the pulses 63 produce output pulses 64 in winding 32 of stage 52, these output pulses being of alternately opposite polarities. The output pulses are transmitted through output winding 32 of stage 52, to the input circuits of stage 53. The negative pulses are of the wrong polarity to produce any effect in stage 53. The positive pulses are effective to actuate stage 53, producing in its output winding 32 signal pulses 65, which are also alternately of opposite polarities. These output pulses 65 are transmitted to the input circuits of stage 54. The negative output pulses are ineffective to actuate stage 54, but the positive output pulses produce output signals 66 in output winding 32 of stage 54. Summarizing, it may be seen that one positive output pulse 64 is produced for each two input pulses 63, one positive output pulse 65 is produced for each four input pulses 63, and one positive output pulse 66 is produced for each eight input pulses 63. The three stages 52, 53 and 54 therefore constitute a three order binary counter circuit.

The negative output pulse 66 from stage 54 is ineffective to actuate stage 55, since its polarity is in the wrong direction. However, the positive output pulse 66 which corresponds to the eighth input pulse 63 is effective to actuate the amplifier 34 in stage 55, in a sense to produce a negative pulse 67 in output winding 32 of stage 55, which negative output pulse is suppressed by the asymmetric impedance element or diode 59. The ninth input signal pulse 63 has no effect beyond the first stage, but the tenth input pulse is transmitted from the first stage through output winding 56 to the input circuit of amplifier 33 in stage 55, where it is effective to actuate that stage to produce a positive output pulse 68 in each of windings 32 and 60. This positive output pulse is transmitted through asymmetric impedance element 59 to the output terminals 57 and 58, where it provides a decimal count of the input signal pulses. It is also transmitted through wire 61 and asymmetric impedance element 62 to the input circuit of stage 53, where it serves to counteract and suppress the corresponding output signal 64 received from stage 52, so that the signal pulse is ineffective to actuate the stage 53, and the counter circuit is then ready to count the next series of ten input pulses.

While we have shown and described certain preferred embodiments of our invention, other modifications thereof will readily occur to those skilled in the art and we therefore intend our invention to be limited only by the appended claims.

We claim:

1. A binary trigger circuit comprising a memory device having a saturable magnetic core, a pair of saturating windings on said core, a pair of saturating means, each including one of said windings, both saturating means being operable in response to input signals of limited duration and of only one predetermined polarity to initiate a variation of the magnetic flux in the core in respectively opposite senses and to continue that variation to saturation, each of said saturating means including limiting means effective to prevent operation of its associated saturating means when the core is saturated in its direction, means to deliver input signals of said limited duration and predetermined polarity simultaneously to both said saturating means, so that successive input signals are effective to saturate the core alternately in opposite directions, and signal output means responsive to variation of the flux in the core in one sense only.

2. A binary trigger circuit as defined in claim 1, in which said signal output means comprises another winding on said core.

3. A binary trigger circuit comprising a memory device including a saturable magnetic core, means for saturating said core with magnetic flux in selectively opposite directions, including two driving windings on said core, two feedback windings on said core, two amplifying means, each including an output circuit and an input circuit, each of said output circuits including one of said driving windings, each of said input circuits including one of said feedback windings, the driving and feedback windings for each amplifying means being connected to provide positive feedback, the feedback windings for the respective amplifying means being connected to provide feedback signals of opposite polarities upon a change in magnetic flux in said core in a given sense, the driving windings being connected to vary the magnetic flux in the core in opposite senses in response to input signals of a predetermined polarity, and means for supplying input signal pulses of limited duration and of said polarity simultaneously to both input circuits, so that successive input signals are effective to saturate the core alternately in opposite directions, and signal output means responsive to variation of the flux in the core in one sense only.

4. A binary trigger circuit as defined in claim 3, in which each said amplifying means comprises a transistor operable selectively in On and Off conditions.

5. A binary trigger circuit as defined in claim 4, in which each said transistor comprises an emitter electrode; and including common biasing means for both emitter electrodes including constant current supply means arranged to supply only sufficient current to maintain one transistor in its On condition.

6. A binary counter circuit comprising: at least two binary trigger stages, each said trigger stage including a memory device having a saturable magnetic core, a pair of saturating windings on said core, a pair of saturating means, each including one of said windings, both saturating means being operable in response to input signals of only one predetermined polarity to vary the magnetic flux in the core in respectively opposite senses and to the point of saturation, each of said saturating means including limiting means effective to prevent operation of its associated saturating means when the core is saturated in its direction; means to deliver input signals of said predetermined polarity simultaneously to both the saturating means of the first stage, so that successive input signals are effective to saturate the core alternately in opposite directions; coupling means including an output winding on the core of said first stage for transmitting output signals of opposite polarities due to variation of the core flux of the first stage in opposite senses to both the saturating means of the second stage, said second stage saturating means being responsive to signals of one polarity only; and signal output means including an output winding on the core of said second stage and responsive to variation of the flux in the second stage core in one sense only.

7. A decimal counter circuit comprising four binary trigger stages, each said trigger stage including a memory device having a saturable magnetic core, a pair of saturating windings on said core, a pair of saturating means, each including one of said windings, both saturating means being operable in response to input signals of predetermined polarity to vary the magnetic flux in the core in respectively opposite senses and to the point of saturation, each of said saturating means including limiting means effective to prevent operation of its associated saturating means when the core is saturated in its direction, means to deliver input signals of said predetermined polarity simultaneously to both the saturating means of the first stage, so that successive input signals are effective to saturate the core alternately in opposite directions; first and second coupling means including output windings on the cores of said first and second stages for transmitting output signals due to variation of the core flux of each of said first and second stages to both the saturating means of the succeeding stage; third coupling means including an output winding on the core of the third stage for transmitting output signals due to variation of the core flux of said third stage to one only of the saturating means of the fourth stage, fourth coupling means including a second output winding on the core of the first stage for transmitting output signals due to variation of the core flux of the first stage to the other of the saturating means of the fourth stage, blocking means including an output winding on the core of the fourth stage for transmitting output signals due to variation of the core flux of the fourth stage by said other saturating means to both the saturating means of the second stage in a sense to block operation thereof, and signal output means including a second output winding on the core of the fourth stage for transmitting output signals due to variation of the core flux of the fourth stage by said other saturating means.

8. A binary trigger circuit comprising amplifier means, means to transmit input signal pulses of limited duration to said amplifier means, a memory device shiftable between two distinct memory conditions and stable in either of said conditions without the expenditure of energy, means including said amplifier means effective upon successive input signal pulses to shift said memory device alternately from one condition to the other and back again, and signal output means operated by said memory device to produce an output signal only when said device shifts from a particular one of said conditions to the other.

9. A binary trigger circuit comprising transistor means, means to transmit input signal pulses of limited duration to said transistor means, a memory device shiftable between two distinct memory conditions and stable in either of said conditions without the expenditure of energy, means including said transistor means effective upon successive input signal pulses to shift said memory device alternately from one condition to the other and back again, and signal output means operated by said memory device to produce an output signal only when said device shifts from one of said conditions to the other.

10. A binary trigger circuit as defined in claim 9, wherein said memory device comprises a saturable magnetic core and said two conditions comprise saturation of the core with magnetic fields of opposite polarities.

11. A binary trigger circuit as defined in claim 10, wherein said signal output means includes an output winding on said core, and means connected in series with said winding and effective to block output signals of one polarity.

12. A magnetic memory device including a saturable magnetic core, means for saturating the said core with magnetic flux including a driving winding on said core and a feedback winding on said core, amplifying means including an output circuit and an input circuit, means normally effective to cut off substantially the flow of current in said output circuit, means connecting said driving winding electrically in said output circuit, means connecting said feedback winding electrically in both said input and output circuits, said feedback winding being arranged both magnetically and electrically, to provide positive feedback, means independent of said feedback winding for supplying an input pulse of limited duration to said input circuit, said driving and feedback windings being effective in response to such an input signal to produce in said driving winding a current continuing until the core becomes saturated.

13. A magnetic memory device, including a saturable magnetic core, means for saturating said core with magnetic flux in selectively opposite directions, including two driving windings on said core, two feed back windings on said core, two amplifying means, each including an output circuit and an input circuit, means normally effective to cut off substantially the flow of current in both said output circuits, each of said output circuits including one of said driving windings, each of said input circuits including one of said feedback windings, the driving and feedback windings for each amplifying device being connected to provide positive feedback, the feedback windings for the respective amplifying means being connected to provide feedback signals of opposite polarities upon a change in magnetic flux in said core in a given sense, the driving windings being connected to vary the magnetic flux in the core in opposite senses in response to input signals of a predetermined polarity, and means external to said feedback windings for supplying input signals of limited duration simultaneously to said input circuits, each said signal being effective to turn on only one of said amplifying means, depending upon the previous condition of saturation of the core, and each said amplifying means being effective when turned on to saturate the core in the sense opposite to said previous condition.

14. A magnetic memory device as defined in claim 13, in which said feedback winding is connected electrically in both said output and input circuits, and is arranged both magnetically and electrically for positive feedback.

15. A magnetic memory device as defined in claim 13, including an output winding on said core separate from said driving and feedback windings.

16. A magnetic memory device as defined in claim 15, including means connected in series with said output winding to block signal pulses of one polarity.

References Cited in the file of this patent

UNITED STATES PATENTS

| | | |
|---|---|---|
| 2,430,457 | Dimond | Nov. 11, 1947 |
| 2,584,811 | Phelps | Feb. 5, 1952 |
| 2,591,406 | Carter et al. | Apr. 1, 1952 |
| 2,605,306 | Eberhard | July 29, 1952 |
| 2,620,448 | Wallace | Dec. 2, 1952 |
| 2,651,728 | Wood | Sept. 8, 1953 |
| 2,655,609 | Shockley | Oct. 13, 1953 |
| 2,682,615 | Sziklai et al. | June 29, 1954 |

Disclaimer 2,772,370.—*George D. Bruce*, Wappinger Falls, and *Joseph C. Logue*, Kingston, N. Y. BINARY TRIGGER AND COUNTER CIRCUITS EMPLOYING MAGNETIC MEMORY DEVICES. Patent dated Nov. 27, 1956. Disclaimer filed Apr. 30, 1957, by the assignee *International Business Machines Corporation.*

Hereby enters this disclaimer to claims 1, 2, 3, 4, 8, 9, 10, 11, 12, 13, 14, 15, and 16 of said patent.

[*Official Gazette May 28, 1957.*]